Dec. 10, 1968 W. B. GUGGI 3,416,063
STABILIZED SINE WAVE INVERTER
Filed May 14, 1965

INVENTOR.
WALTER B. GUGGI
BY Edward J. Norton
ATTORNEY

United States Patent Office 3,416,063
Patented Dec. 10, 1968

3,416,063
STABILIZED SINE WAVE INVERTER
Walter B. Guggi, Niederglatt, Switzerland, assignor to Radio Corporation of America, a corporation of Delaware
Filed May 14, 1965, Ser. No. 455,700
11 Claims. (Cl. 321—16)

ABSTRACT OF THE DISCLOSURE

Known parallel inverters, which include current valves having thyratron-like characteristics, provide an output which may vary in voltage with change of the load on the inverter. A feedback circuit is provided to stabilize the output voltage of such an inverter, wherein some of the alternating current present in the output device is fed back by means of a feedback winding of a transformer to which the output is applied, and this fed back current is rectified and is applied in voltage parallel connection with the direct current source.

Figure 1:
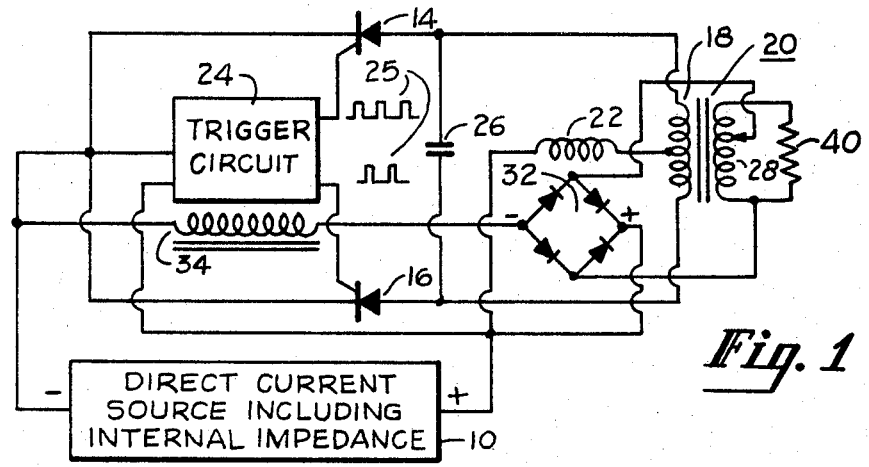

This invention relates to derectifiers or inverters, and more particularly to voltage stabilized inverters, including current valves, for producing voltage stabilized alternating current outputs.

Known square wave parallel inverters, which include current valves having thyratron-like characteristics, provide output waves which may vary in voltage with changes in load. Furthermore, when a sine or quasi-sine wave output is desired and sufficient tuning capacitance is added to the square wave inverter to provide the required sine-like shape of wave output, changes in load greatly affect the output voltage of the modified inverter since the changes of load vary the Q of the inverter tuned circuit. That is, an increase in the Q of the tuned circuit permits additional energy storage therein whereby the voltage thereacross increases. Also additional energy may be stored in a large series inductor forming part of the inverter whereby the voltage across it also increases. Therefore, the regulation of a quasi-sine wave regulator may be quite poor. In a typical case, a variation from zero to full load of such a quasi-sine wave inverter may vary the output voltage through a three to one range. Furthermore, instability effects with load changes are quite severe and can cause destruction of parts of the apparatus or connected loads. Output transformers forming part of the quasi-sine wave inverter have to be heavily over-designed to prevent temporary saturation thereof and the consequent commutation failures.

It is an object of this invention to provide an inverter circuit having improved regulation as compared to prior art inverters.

Another object of this invention is to provide an improved inverter apparatus having an output voltage of quasi-sine wave shape.

It is another object of this invention to provide a voltage stabilized inverter apparatus having a quasi-sine wave output.

It is a further object of this invention to provide a quasi-sine wave inverter apparatus including a voltage stabilizing means wherein the sine-like wave shape of the output wave is not substantially deteriorated by operation of the voltage stabilization means.

It is a further object of this invention to provide an improved quasi-sine wave inverter apparatus which remains stable under sudden load changes and inherently protects itself and connected loads from resulting voltage transients caused by such load changes.

It is a further object of this invention to provide a voltage stabilized quasi-sine wave inverter apparatus having a quasi-sine wave output in which the waveshape does not deteriorate with loads in which the current is a nonlinear function of supply voltage.

It is a further object of this invention to provide a voltage stabilized quasi-sine wave inverter capable of handling loads with a large variation in power factor.

It is a further object of this invention to provide an improved quasi-sine wave apparatus with smaller and more efficient components, such as output transformers, resulting in reduced weight, size and construction cost.

It is a further object of this invention to provide a quasi-sine wave inverter apparatus with extensive overload immunity and protection against commutation failure.

It is a further object of this invention to provide an apparatus for efficient generation of quasi-sine wave high frequency power with stabilized output level useable up to the limit of the switching speed of the included current valve.

According to this invention, a direct current, which is provided by a source including internal resistance, is commutated or chopped as by one or more current valves having thyratron-like characteristics. The commutated current is applied to an output device effectively through a relatively large inductor in such a manner that an alternating voltage appears in the output device. Some of the alternating current present in the output device is fed back by means of a feedback winding of a transformer to which the output is applied, and this fed back current is rectified and is applied in voltage parallel connection with the direct current source. Due to the resistance of the source, the fed back current is effective to improve the regulation of the source.

In another embodiment of this invention, the direct current source may include a rectifier. In this embodiment the voltage fed back is of such amplitude as to back bias the rectifier included in the source, and therefore cut off the supply of current from the source, at or about no load. Therefore, if the output voltage rises too high, the source is substantially cut off. However, if the output voltage falls off, as when a load is applied thereto, the source is no longer cut off, whereby the output voltage is stabilized close to the value corresponding to the rectifier cut off voltage.

In another embodiment of this invention, the output voltage is compared with a reference voltage and the difference between the reference voltage and the output voltage controls the value of the voltage fed back to the source.

In each of the embodiments of this invention, sufficient capacity may be added to the output device to change the output wave from a square wave to a quasi-sine wave.

Figure 2:
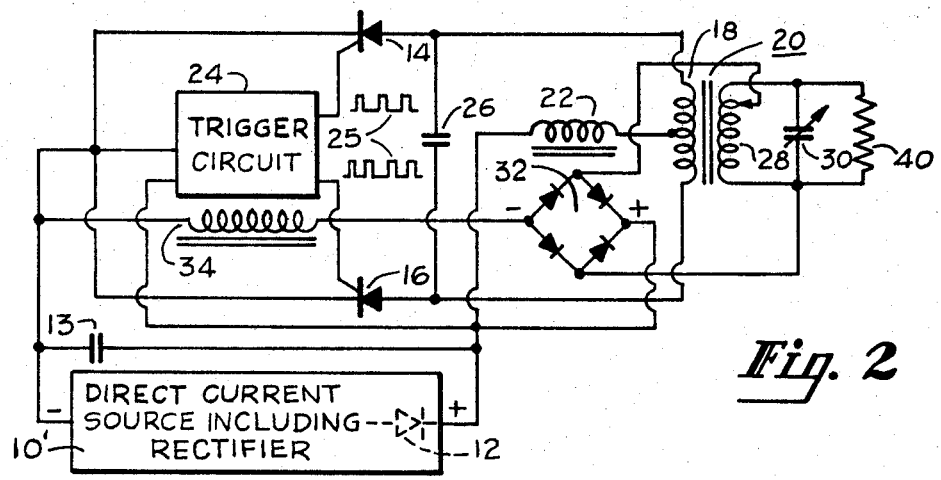
Figure 3:
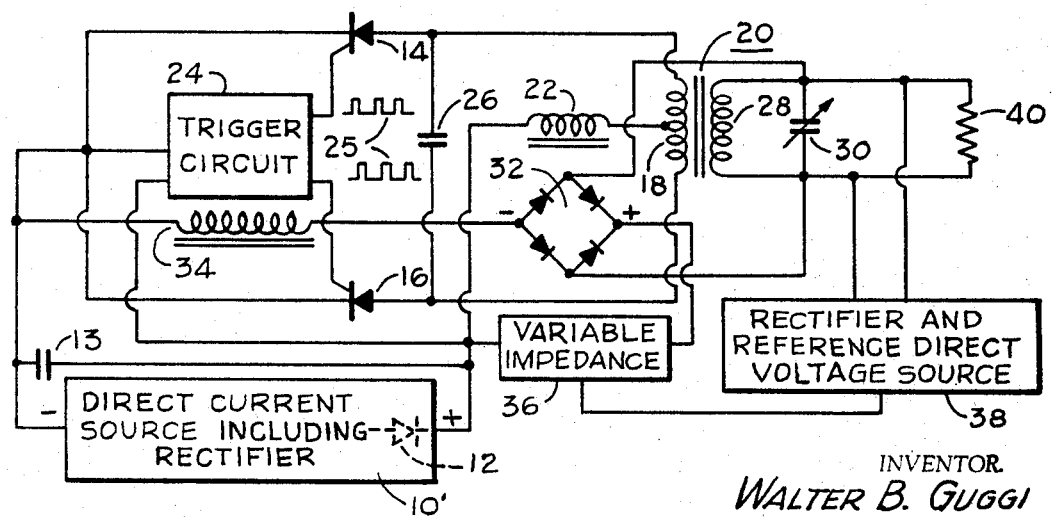

The novel features of this invention, both as to its organization and method of operation as well as additional objects and advantages thereof, will be understood more readily from the following description when read in conjunction with the accompanying drawings in which:

FIGS. 1, 2 and 3 are circuit diagrams of three embodiments of the voltage stabilized inverter of this invention.

Referring first to FIG. 1, a direct current source 10 which includes internal resistance is provided. The negative terminal of the source 10 is connected to the cathodes of two current valves shown as silicon controlled rectifiers (SCR) 14 and 16. The anodes of the SCR's 14 and 16 are respectively connected to the terminals of the primary winding 18 of an output transformer 20 which may have an iron core. A center tap on the primary winding 18 is connected through a smoothing inductor 22, which may have an iron core, to the positive terminal of the source 10. A trigger circuit 24, which may be supplied from the source 10, provides alternate positive going pulses 25 from its two output terminals. The output terminals of the trigger circuit 24 are respectively connected to the control electrodes of the SCR's 14 and 16. A commutating capacitor 26 is connected across the anodes of the SCR's 14 and 16.

The SCR's 14 and 16 are rectifying devices having thyratron-like characteristics in that they may be rendered conductive between their main electrodes upon application of a positive going voltage to their control electrodes with respect to their cathodes, and in that once they are rendered conductive, they remain conductive until the voltage across their anodes and cathodes is reduced to a low value or is reversed in polarity.

The circuit as so far described, acts as a substantially square wave inverter. For example, triggering by the trigger circuit 24 of one of the SCR's causes it to become conductive and causes reduction of the voltage across the anode and cathode of the other SCR to the point where it is no longer conductive, whereby current flows alternately from the center tap of the primary winding 18 through the two halves thereof. The inductor 22 acts to reduce transients, however, the voltage induced in the secondary winding 28 of the transformer 20 is of alternating square wave form. Due to the impedance of the source and of the load represented by the resistor 40 connected across the secondary winding 28, the voltage of the square wave inverter decreases as the load increases. The load may be connected across the primary winding 18 if desired.

To improve the voltage regulation of the square wave inverter, diagonal terminals of a rectifier bridge 32 are connected respectively to a terminal of the secondary winding 28 and to a tap thereon, while the other terminals of the rectifier bridge 32 are connected in voltage parallel to the terminals of the source 10, that is, the negative terminal of the bridge 32 is connected to the negative terminal of the source 10 and the positive terminal of the rectifier bridge 32 is connected to the positive terminal of the source 10. A smoothing inductance coil 34 which may have an iron core is included in series in one of these last mentioned connections.

The operation of the described voltage stabilized square wave inverter is as follows: under no load conditions, the voltage at the secondary winding 28 of the transformer 20 rises. The voltage fed back to the source 10 by the circuit including the rectifier bridge 32 from the secondary winding of the transformer 20 is higher than the source voltage and tends to reduce the voltage provided by the source 10, due to the internal impedance thereof. The energy stored in the feedback circuit is absorbed by the source 10. Upon application of a load 40 to the square wave inverter, the voltage fed back to the source is reduced due to voltage drop in the inverter components, whereby the voltage supplied by the source 10 increases. The final result is that the output voltage tends to be stabilized at a value such that the fed back voltage does not differ greatly from the voltage of the source 10. The feedback voltage is taken from the secondary 28 of the transformer 20 rather than its primary 18, so that a highly irregular wave appearing in the primary winding 18 appears as a smoother wave in the secondary 28, whereby smoother voltage regulation results. The inductance coil 34, which acts as a smoothing choke helps to eliminate current surges in the feedback system, should be large enough to provide smoothing and yet small enough to permit variations in direct current flow therethrough. Since the source 10 acts as its own reference voltage, a voltage source 10 having good voltage stability should be chosen. The voltage of the output of the described inverter may be changed by varying the voltage of the source 10 to some extent or by varying the turns ratio of the transformer 20, as by varying the tap position on the secondary 28.

Since FIG. 2 differs from FIG. 1 only in the type of source used and in the fact that a storage capacitor and a tuning capacitor are added to FIG. 2, only the differences between the two figures will be pointed out. In FIGS. 1 and 2 the same reference characters are applied to similar elements.

In FIG. 2, the source 10' may include an alternating current source (not shown) and a rectifier 12, or it may include a battery or a direct current generator and the rectifier 12. Furthermore, in FIG. 2, a storage capacitor 13 is connected across the source 10' and also a tuning capacitor 30 which may be variable is connected across the secondary winding 28 of the output transformer 20. The purpose of the storage capacitor 13 is stated below. The capacitor 30 causes the voltage wave provided by the inverter of FIG. 2 to have a quasi-sine wave shape. The inductor 22 must be large enough to support this mode of operation. That is, the output circuit of the inverter of FIG. 2 may be tuned to the frequency of the trigger circuit 24 to thereby provide substantially a sine wave output, or the size of the capacitor 30 may be chosen such that the output wave resembles a sine wave. As noted above, an inverter which provides a quasi-sine wave output has poorer voltage regulation than an unregulated square wave inverter unless voltage regulating means are provided. The voltage regulating means of FIG. 2 comprise the feedback circuit including the feedback coil 28 and the rectifier bridge 32 and their connections as described in connection with FIG. 1. The operation of the voltage regulation means of FIG. 2 is described as follows: under no load conditions the voltage fed back to the source 10' by the circuit including the rectifier bridge 32 is sufficient to back bias the rectifier 12 comprising part of the source 10', substantially cutting off any current supplied thereby. The energy fed back may be stored in the capacitor 13. Upon application of a load 40 to the secondary winding 28 of the quasi-sine wave inverter, the voltage fed back to the source 10' is reduced due to voltage drop in the inverter components, reducing or removing a blocking bias from the rectifier 12, whereby the current supplied by the source 10' increases. The final result is that the output voltage tends to be stabilized at a value such that the fed back voltage does not differ greatly from the voltage of the source 10'. Again as in FIG. 1, the fed back voltage is taken from the secondary winding 28 of the transformer 20 rather than from its primary winding 18 so that the highly irregular wave shape appearing at the primary winding 18 appears as a smoother wave in the secondary winding 28 whereby a smoother voltage is fed back and smoother voltage regulation results. Again in FIG. 2 as in FIG. 1, the source 10' acts as its own reference voltage and therefore a voltage source 10' having good voltage stability should be chosen. The voltage of the output of the quasi-sine wave inverter may be changed by varying the voltage of the source 10' to some extent or by varying the turns ratio of the transformer 20 as by varying the tap position on the secondary 28.

Since the source 10 acts as a reference voltage for the inverter, voltage regulation built into the source 10 may compensate for variable IR drops in the inverter. Additional compensation may also be provided by additional feedback regulation, as shown in FIG. 3. This figure differs from FIG. 2 only in that a connection from a terminal of the bridge rectifier 32 to a terminal of the source, the positive terminal as shown in FIG. 3, includes a gain control device 36 such as a voltage variable impedance or resistor. The alternating voltage appearing across the output winding 28 is applied to a voltage reference device 38 which includes a rectifier and a reference voltage means, and the error voltage, that is the voltage difference between the inverter output voltage and the direct reference voltage included in the device 38, is applied to the gain control device 36 to vary its resistance or transfer ratio. The feedback voltage which is applied to the source 10 will then depend on the difference between the voltage across the load and the fixed reference voltage included in the reference voltage device 38, whereby additional regulation improvement of the inverter of FIG. 3 will result over that of FIG. 2.

Due to the voltage regulation of the derectifiers described, the output transformer 20 may be designed for its rated load and need not be over-designed, resulting in a lighter and less expensive derectifier. Since the output transformer is never saturated, commutation failure is avoided.

Although only three embodiments of a stabilized inverter have been shown and described, it will undoubtedly be apparent to those skilled in the art that variations are possible within the spirit of the present invention. For example, higher output frequency may be achieved if an air core transformer 20 is provided instead of the iron core one shown. Or instead of connecting the rectifier bridge 32 across a portion of the output winding 28, the bridge 32 may be connected across an added feedback winding (not shown) on the transformer 20. Or, other current chopping means may be used instead of the SCR circuit described. However, it should be understood that the foregoing descriptions are to be considered as illustrative and not in a limiting sense.

What is claimed is:

1. Apparatus for converting a direct current supply into a regulated alternating current output comprising
    a pair of input terminals to be connected respectively to the positive and negative terminals of a source of direct current,
    a current chopping means connected to said pair of input terminals to convert said direct current to alternating current,
    a transformer having a primary and a secondary winding,
    said primary winding being connected to receive alternating current from said chopper,
    a rectifying means coupled to said secondary winding and having a positive and a negative output terminal, and
    means for connecting said positive input terminal to said positive output terminal and for connecting said negative input terminal to said negative output terminal, whereby the alternating current voltage provided by said converting apparatus is regulated, one of said means including a smoothing inductive reactor.

2. Apparatus for converting a direct current supply into a regulated alternating current output comprising
    a pair of input terminals to be connected respectively to the positive and negative terminals of a direct current supply,
    a current chopping means including a pair of current valves connected to said pair of input terminals to convert said direct current to an alternating current at a predetermined frequency,
    connection means for connecting a load to said current chopping means,
    a transformer having a primary and a secondary winding,
    said primary winding being connected to receive alternating current from said chopper,
    rectifying means coupled to said secondary winding and having a positive and a negative output terminal, and
    means for connecting said positive input terminal to said positive output terminal and for connecting said negative input terminal to said negative output terminal, one of said means including a smoothing inductive reactor.

3. Apparatus for converting a direct current supply into a regulated alternating current output of quasi-sine wave form comprising
    a pair of input terminals to be connected respectively to the positive and negative terminals of a direct current supply,
    a current chopping means connected to said pair of input terminals to convert said direct current to an alternating current at a predetermined frequency,
    connection means for connecting a load to said current chopping means,
    a transformer having a primary and secondary winding,
    a capacitor connected across one of said windings, the reactances of said transformer and said capacitor being such that said chopper provides a quasi-sine wave at said predetermined frequency,
    said primary winding being connected to receive alternating current from said chopper,
    rectifying means coupled to said secondary winding and having a positive and a negative output terminal, and
    means for connecting said positive input terminal to said positive output terminal and for connecting said negative input terminal to said negative output terminal.

4. Apparatus for converting a direct current supply into a regulated alternating current output of quasi-sine wave form comprising
    a pair of input terminals to be connected respectively to the positive and negative terminals of a direct current supply,
    a current chopping means connected to said pair of input terminals to convert said direct current to an alternating current at a predetermined frequency,
    output connection means for connecting a load to said current chopping means,
    a transformer having a primary and a secondary winding,
    a capacitor connected across one of said windings, the reactances of said transformer and said capacitor being such that said chopper provides a quasi-sine wave at said predetermined frequency,
    said primary winding being connected to receive alternating current from said chopper,
    rectifying means coupled to said secondary winding and having a positive and a negative output terminal, and
    means for connecting said positive input terminal to said positive output terminal and for connecting said negative input terminal to said negative output terminal,
    said connecting means including an inductor, the reactance of said inductor at said predetermined frequency being so chosen that regulation is provided without clipping the peaks of the quasi-sine wave output of said inverter.

5. A voltage regulated sine wave inverter for inverting a direct current from a direct current source having terminals and including a rectifier comprising
    an output device,
    a current valve having main electrodes and a control electrode, said current valve being rendered conductive upon application of a control voltage to said control electrode,
    a first and a second input terminal to be connected respectively to the positive and negative terminals of said current source,
    an electrical connection between said first input terminal through the main electrodes of said current valve and said output device in tandem to said second input terminal,
    means for applying voltage pulses to said control electrode at a predetermined frequency to render said current valve periodically conductive, whereby an alternating current flows in said output device,
    said output device including sufficient reactance so as to cause said alternating current to exhibit quasi-sine wave form,
    means having a positive and a negative output terminal coupled to said output device for rectifying a portion of the output of said inverter appearing across said output device to provide a rectified voltage at terminals of said rectifier means, and
    connections for respectively connecting said positive input terminal to said positive output terminal and for connecting said negative input terminal to said negative output terminal.

6. A voltage regulating sine wave inverter for inverting a direct current from a direct current source having terminals and including a rectifier comprising an output device, a pair of current valves each having a pair of main electrodes and a control electrode, said current valves becoming conductive upon the application of a control voltage to said control electrodes, a first and second input terminal to be connected respectively to the positive and negative terminals of said current source, an electrical connection between said first input terminal through the main electrodes of one of said current valves, through said output device, and through the main electrodes of the other of said current valves to said other input terminal, means for applying voltage pulses alternately to said control electrodes of a predetermined frequency to render said current valves periodically and alternately conductive whereby an alternating current flows through said output device at said predetermined frequency, said output device including sufficient reactance so as to cause said alternating current to exhibit quasi-sine wave form, means having a positive and a negative output terminal coupled to said output device for rectifying a portion of the output of said inverter appearing across said output device to provide a rectified voltage at the terminals of said rectifier means, and connections for respectively connecting said positive input terminal to said positive output terminal and for connecting said negative input terminal to said negative output terminal.

7. A voltage regulated sine wave inverter for inverting a direct current from a direct current source having terminals comprising an output device, a current valve having main electrodes and a control electrode, said current valve being rendered conductive upon application of a control voltage to said control electrode, a rectifier, a first and a second input terminal to be connected respectively to the positive and negative terminals of said current source, one of said connections including said rectifier, an electrical connection between said first input terminal through the main electrodes of said current valve and said output device in tandem to said second input terminal, means for applying voltage pulses to said control electrode at a predetermined frequency to render said current valve periodically conductive whereby an alternating current flows in said output device, said output device including sufficient reactance as to cause said alternating current to exhibit quasi-sine wave form, means having a positive and a negative output terminal coupled to said output device for rectifying a portion of the output of said inverter appearing across said output device to provide a rectified voltage at terminals of said rectifier means, and connections for respectively connecting said positive input terminal to said positive output terminal and for connecting said negative input terminal to said negative output terminal.

8. A voltage regulated sine wave inverter for inverting a direct current from a direct current source having terminals and including a rectifier comprising an output device having two terminals and a central tap, a pair of current valves each having an anode, a cathode and a control electrode, an inductor having one terminal connected to said central tap, the other terminal of said inductor being adapted to be connected to the positive terminal of said source, connections between the two terminals of said output device respectively to the anodes of said current valves, a connection between the two cathodes of said current valves for connections to the negative terminal of said source, a source of trigger voltage for producing alternately appearing control pulses at a predetermined frequency, means for applying said alternate pulses to respective ones of said control electrodes whereby an alternating current flows through said output device, said output device having sufficient reactance to cause said alternating current to exhibit quasi-sine wave shape, means having positive and negative output terminals coupled to said output device for rectifying a portion of the output of said inverter appearing across said output device to provide a rectified voltage at the terminals of said rectifier means, and means for respectively connecting said other terminal of said inductor to the positive terminal of said rectifier means and said cathodes to the negative terminal of said rectifier means.

9. A voltage regulated sine wave inverter for inverting a direct current from a direct current source having terminals and including a rectifier comprising an output device having two terminals and a central tap, a pair of current valves each having an anode, a cathode and a control electrode, an inductor having one terminal connected to said central tap, the other terminal of said inductor being adapted to be connected to the positive terminal of said source, connections between the two terminals of said output device respectively to the anodes of said current valves, a connection between the two cathodes of said current valves for connections to the negative terminals of said source, a source of trigger voltage for producing control pulses at a predetermined frequency, means for applying said alternate control pulses to respective ones of said control electrodes whereby an alternating current flows through said output device, said output device including sufficient reactance so said alternating current is of sine wave shape, means having positive and negative output terminals coupled to said output device for rectifying a portion of the output of said inverter appearing across said output device to provide a rectified voltage at the terminals of said rectifier means, means for respectively connecting said other terminal of said inductor to the positive terminal of said rectifier means and said cathodes to the negative terminal of said rectifier means, one of said last named connections including a variable impedance, and means including an additional rectifier and a source of direct reference voltage for varying the impedance of said variable impedance means in accordance with the voltage appearing across said output device.

10. A voltage regulated sine wave inverter for inverting a direct current from a direct current source having terminals comprising an output device having two terminals and a central tap, a pair of current valves each having an anode, a cathode and a control electrode,
a rectifier,
an inductor having one terminal connected to said central tap, the other terminal of said inductor being adapted to be connected by a first connector to the positive terminal of said source,
connections between the two terminals of said output device respectively to the anodes of said current valves,
a connection between the two cathodes of said current valves for connection by a second connector to the negative terminals of said source,
one of said first and second connectors including said rectifier,
a source of trigger voltage for producing control pulses at a predetermined frequency,
means for applying said alternate control pulses to respective ones of said control electrodes whereby an alternating current flows in said output device,
said inverter including sufficient reactance to said alternating current is of quasi-sine wave form,
means having positive and negative terminals coupled to said output device for rectifying a portion of the output of said inverter appearing across said output device to provide a rectified voltage at the terminals of said rectifier means, and
means for respectively connecting said other terminal of said inductor to said positive terminal of said rectifying means and the cathodes of said current valves to the negative terminal of said rectifier means.

11. A voltage regulated sine wave inverter for inverting a direct current from a direct current source having terminals comprising
an output device having two terminals and a central tap,
a pair of current valves each having an anode, a cathode and a control electrode,
a rectifier,
an inductor having one terminal connected to said central tap, the other terminal of said inductor being adapted to be connected by a first connector to the positive terminal of said source,
connections between the two terminals of said output device respectively to the anodes of said current valves,
a connection between the two cathodes of said current valves for connections by a second connector to the negative terminals of said source,
one of said first and second connectors including said rectifier,
a source of trigger voltage for producing control pulses at a predetermined frequency,
means for applying said alternate pulses to respective ones of said control electrodes whereby an alternating current flows through said output device,
said inverter including sufficient reactance so said alternating wave is of sine wave shape,
means having positive and negative output terminals coupled to said output device for rectifying a portion of the output of said inverter appearing across said output device to provide a rectified voltage at the terminals of said rectifier means,
means for respectively connecting said other terminal of said inductor to the positive terminal of said rectifier means and said cathodes to the negative terminal of said rectifier means,
one of said last named connections including a variable impedance, and
means including an additional rectifier and a source of direct reference voltage for varying the impedance of said variable impedance means in accordance with the voltage appearing across said output device.

References Cited

UNITED STATES PATENTS

| | | |
|---|---|---|
| 3,009,093 | 11/1961 | Seike. |
| 3,012,181 | 12/1961 | Schultz. |
| 3,014,172 | 12/1961 | Brunson. |
| 3,048,764 | 8/1962 | Murphy. |
| 3,085,211 | 4/1963 | Jensen et al. |
| 3,120,634 | 2/1964 | Genuit. |
| 3,131,343 | 4/1964 | Reinert. |
| 3,171,077 | 2/1965 | Murphy et al. |
| 3,222,618 | 12/1965 | Ressler. |
| 3,241,032 | 3/1966 | Firestone. |

LEE T. HIX, *Primary Examiner.*

W. M. SHOOP, *Assistant Examiner.*

U.S. Cl. X.R.

321—18, 45